United States Patent
Ha

(10) Patent No.: US 8,268,050 B2
(45) Date of Patent: Sep. 18, 2012

(54) CO₂ SEPARATION APPARATUS AND PROCESS FOR OXY-COMBUSTION COAL POWER PLANTS

(75) Inventor: Bao Ha, San Ramon, CA (US)

(73) Assignee: Air Liquide Process & Construction, Inc., Houston, TX (US)

( * ) Notice: Subject to any disclaimer, the term of this patent is extended or adjusted under 35 U.S.C. 154(b) by 1223 days.

(21) Appl. No.: 11/695,446

(22) Filed: Apr. 2, 2007

(65) Prior Publication Data

US 2008/0196587 A1 Aug. 21, 2008

Related U.S. Application Data

(60) Provisional application No. 60/890,233, filed on Feb. 16, 2007.

(51) Int. Cl.
*B01D 53/14* (2006.01)

(52) U.S. Cl. .............. 95/204; 95/227; 95/228; 95/229; 95/236; 62/617

(58) Field of Classification Search ............ 95/183, 95/236, 193–194, 227–229, 204; 62/617; 60/320
See application file for complete search history.

(56) References Cited

U.S. PATENT DOCUMENTS

| | | | | |
|---|---|---|---|---|
| 4,417,449 A * | 11/1983 | Hegarty et al. | ................. | 62/622 |
| 4,977,745 A * | 12/1990 | Heichberger | ................... | 62/619 |
| 6,035,662 A * | 3/2000 | Howard et al. | ................. | 62/617 |
| 6,301,927 B1 * | 10/2001 | Reddy | .............................. | 62/619 |
| 2008/0173584 A1 * | 7/2008 | White et al. | .................. | 210/656 |
| 2008/0173585 A1 * | 7/2008 | White et al. | .................. | 210/656 |
| 2008/0176174 A1 | 7/2008 | White et al. | | |
| 2009/0298957 A1 * | 12/2009 | Gauthier et al. | .............. | 518/700 |

FOREIGN PATENT DOCUMENTS

| | | |
|---|---|---|
| EP | 0 503 910 A1 | 9/1992 |
| EP | 503910 A1 * | 9/1992 |
| EP | 0994318 | 4/2000 |
| WO | 2006054008 | 5/2006 |
| WO | 2006055324 | 5/2006 |
| WO | 2007126972 | 11/2007 |

OTHER PUBLICATIONS

Michael B Wilkinson, et al., CO2 Capture Via Oxyfuel Firing: Optimisation of a retrofit Design Concept for a Refinery..., 1st Nat'l Conf. on Carbon Seq., May 12, 2001, WashD.C.
Oxy Combustion Processes for CO2 Capture from Power Plant, IEA Greenhouse R&D Programme, Report No. 2005/9, Jul. 2005.
Partial Search Report for PCT/IB2008/050392.
Written Opinion of PCT/IB2008/050392.

* cited by examiner

*Primary Examiner* — Duane Smith
*Assistant Examiner* — Ives Wu
(74) *Attorney, Agent, or Firm* — Elwood L. Haynes

(57) ABSTRACT

An improved process for the separation of carbon dioxide from the flue gas of an oxy-combustion power plant is provided. The flue gas is compressed, cleaned, cooled and dried. This clean, compressed dry flue gas is then further cooled, partially condensed and separated into liquid and vapor streams. The liquid streams, which contain a high concentration of carbon dioxide, are vaporized, compressed and exported to an end user. The vapor streams are heated and expanded, in order to extract useable energy. At least two expanders are used to extract this energy, with an intermediate warming step.

20 Claims, 8 Drawing Sheets

$CO_2$ SEPARATION APPARATUS AND PROCESS FOR OXY-COMBUSTION COAL POWER PLANTS

CROSS REFERENCE TO RELATED APPLICATIONS

This application claims the benefit of U.S. Provisional Application No. 60/890,233, filed Feb. 16, 2007, the entire contents of which are incorporated herein by reference.

BACKGROUND

It is believed that there are global warming effects that are being caused by the introduction of increased carbon dioxide into the atmosphere. One major source of carbon dioxide emission is the flue gas that is exhausted as a result of a power generation plant's combustion process. Therefore, there have been several efforts by governments and utility companies worldwide, to reduce these emissions.

There are two principal types of power plants that are based on combustion processes; coal combustion and natural gas combustion. Both of these processes produce carbon dioxide as a byproduct when generating power. Efforts have been made to increase the efficiency of the burner, and, therefore, the basic combustion process itself. The intent of these efforts has been to reduce carbon monoxide (the result of imperfect combustion), oxides of nitrogen, and other pollutants. However, since the production of carbon dioxide and water are the basic products of the chemical reaction of combustion, the most efficient technique to minimize the carbon dioxide emission is to capture as much of the carbon dioxide as possible as it is being created by the power plants. In order to truly maximize the efficiency of this technique, existing coal combustion plants, which represent a large portion of the power generation plants worldwide, must also be targeted. The oxy-combustion technique is very interesting, and has significant advantages, since it can be adapted to existing facilities.

Traditional power plants use air as the source of oxidant to combust the fuel (typically coal). Steam is generated by indirect heat exchange with the hot combustion products. The steam is then expanded in turbines to remove useful energy, and, thereby, produce power. The combustion process produces carbon dioxide as a by-product, which is mixed with the residual nitrogen of the combustion air. Due to the high content of nitrogen in the inlet air (78 mol %), the carbon dioxide is diluted in the flue gas. To insure full combustion, the power plants must also run with an excess air ratio that further dilutes the carbon dioxide in the flue gas. The concentration of carbon dioxide in the flue gas of an air combustion plant is typically about 20 mol %.

This dilution of the carbon dioxide increases the size and the power consumption of any carbon dioxide recovery unit. Because of this dilution, it becomes very costly and difficult to recover the carbon dioxide. Therefore, it is desirable to produce flue gas with at least about 90% to 95 mol % carbon dioxide, in order to minimize the abatement cost. The current technology for carbon dioxide recovery from flue gas utilizes amine contact tower to scrub out the carbon dioxide. However, the high amount of heat that is needed to regenerate the amine and extract the carbon dioxide, reduces the amine processes cost effectiveness.

In order to avoid the dilution of carbon dioxide in the nitrogen, the power generation industry is switching to an oxy-combustion process. Instead of utilizing air as an oxidant, high purity oxygen (typically about 95% purity or better) is used in the combustion process. The combustion heat is dissipated in the recycled flue gas concentrated in the carbon dioxide. This technique makes it possible to achieve a flue gas containing between about 75 mol % and 95 mol % carbon dioxide. This is a significant improvement over the previous concentration of about 20 mol %, which is obtained with air combustion. The purity of carbon dioxide in oxy-combustion's flue gas ultimately depends on the amount of air leakage into the system and the purity of oxygen being utilized. The necessary high purity oxygen is supplied by an air separation unit.

In one example of the traditional oxy-combustion process, the carbon dioxide removal process begins as the flue gas exiting the boiler is cooled and sent to an electrostatic precipitator. A portion of the flue gas is further cooled, the moisture is removed, and this portion of the flue gas is recycled to the coal handling section (mill, dryer, etc). Another portion of the flue gas is recycled back to the boiler, and the remaining portion is extracted as flue gas output and is sent to the carbon dioxide purification unit. One example of this type of oxy-combustion is illustrated in FIG. 1.

Since pure oxygen, hence power input and capital cost, is required in the oxy-combustion process to facilitate the capture of carbon dioxide, the whole process, including the oxygen plant and the carbon dioxide capture and purification must be very efficient to minimize the power consumption. Otherwise, the economics of the carbon dioxide recovery will become unattractive to the operator of the power generation plant. In summary, the carbon dioxide capture with oxy-combustion is appealing in terms of pollution abatement, however, in order to achieve it, the capital expenditure and the power input must be minimized to avoid a prohibitive increase in power cost.

As previously mentioned, carbon dioxide purities of 90% or higher (typically 95% or higher) are desirable for many subsequent carbon dioxide abatement techniques (such as deep well injection, deep sea injection or enhanced oil recovery systems). Due to air leakage and the presence of inert gases in the high purity oxygen (nitrogen and argon), in practice the flue gas can be as low as about 75% carbon dioxide. The carbon dioxide concentration must therefore be increased to 90% to 95% in some type of purification process. Common industry specifications typically require that the overall carbon dioxide recovery ratio must be about 90% and even higher than 95% in some cases.

On example, of such a purification system, was described in the Publication of IEA Green House R&D Programme-Oxycombustion Processes for $CO_2$ Capture From Power Plant (Report Number 2005/9, dated July, 2005). This process is illustrated in FIG. 2.

In the process indicated in FIG. 2, the flue gas is washed. Its acid content is removed, it is compressed to a pressure greater than about 30 bar, then it is dried (stream 1). A cryogenic partial condensation process is then utilized to concentrate the carbon dioxide (stream 7 and stream 8).

The carbon dioxide is further compressed to very high pressure (between about 80 bar and about 120 bar) (stream 9). The off-gas leaving the process at 30 bar (stream 10) is generally heated to about 300° C., then it is expanded in a hot gas expander in order to more efficiently recover the potential energy.

In order to heat to 300° C., the gas must be heated first to about 150° C. by exchanging heat with an adiabatic compressor (i.e. the compression heat is not removed by an intercooler, and the exit temperature is allowed to rise to about 200° C.). The gas is then heated to 300° C. by heat exchange with the flue gas from the boiler.

As evidence of these thermal costs, it is noted that an adiabatic compressor (either feed gas or carbon dioxide compressor) consumes more power than the isothermal compressor equipped with intercoolers. Also, the hot gas expander, because of the high expansion ration, (about 30 to 1) and high operating temperature, requires a multiple stage (usually axial type) expander. The skilled artisan will recognize that this type of expander is typically quite expensive. And the heating of the off-gas from about 150° C. to about 300° C. by the flue gas consumes the valuable heat of the boiler, and, therefore, it is possible that steam production will be effected. This will then result in a lower power output from the stream turbines. This reduces the efficiency of the overall process. This also requires a gas-to-gas heat exchanger in the boiler, which, is typically, very expensive. Furthermore, utility companies involved with oxycombustion are also evaluating techniques to minimize the air leakage to further improve the $CO_2$ content of flue gases. This effort also reduces the flowrate of the off-gas stream, such that its recoverable energy becomes smaller, compared with the total power input. Therefore, it becomes less attractive to use less efficient adiabatic compressors to recover the reduced power content of lower off-gas flow.

In another example of the existing art, European patent number 0503910 presents a process scheme, wherein the compressed dry flue gas is treated in 2 distillation columns arranged in series. The first column removes the inert gases ($O_2$, $N_2$ and Argon) and produces a bottom liquid containing $CO_2$, acid gases, and less than 5 ppm $O_2$. This liquid then feeds in the second column, which then yields the pure $CO_2$ overhead liquid and the acid gases bottom liquid. Since these products are in liquid form, this process requires intensive cooling by external refrigeration equipment and additional nitrogen expansion by the oxygen plant. The inert gas extracted from the flue gas is expanded in 3 expanders in series with intermediate reheats to keep the exhaust temperatures of the expanders above the freezing point of $CO_2$.

For the foregoing reasons, a need exists for a more cost effective and efficient method for removing carbon dioxide from the flue gas that is generated by oxy-combustion plants. In particular, a need exists for a method that recovers energy from the expansion of the off-gas stream in a more efficient and cost effective manner.

SUMMARY

The present invention is directed to a method that satisfies the need in general for a more cost effective and efficient method for removing carbon dioxide from the flue gas that is generated by oxy-combustion plants.

In one aspect of the present invention, an improved carbon dioxide separation process for oxy-combustion coal power plants is provided. This process requires warming at least a portion of a waste stream, that has been separated from a flue gas stream. This waste stream is then expanded, which results in a cool vapor exhaust stream.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF THE PREFERRED EMBODIMENTS

Figure 1:
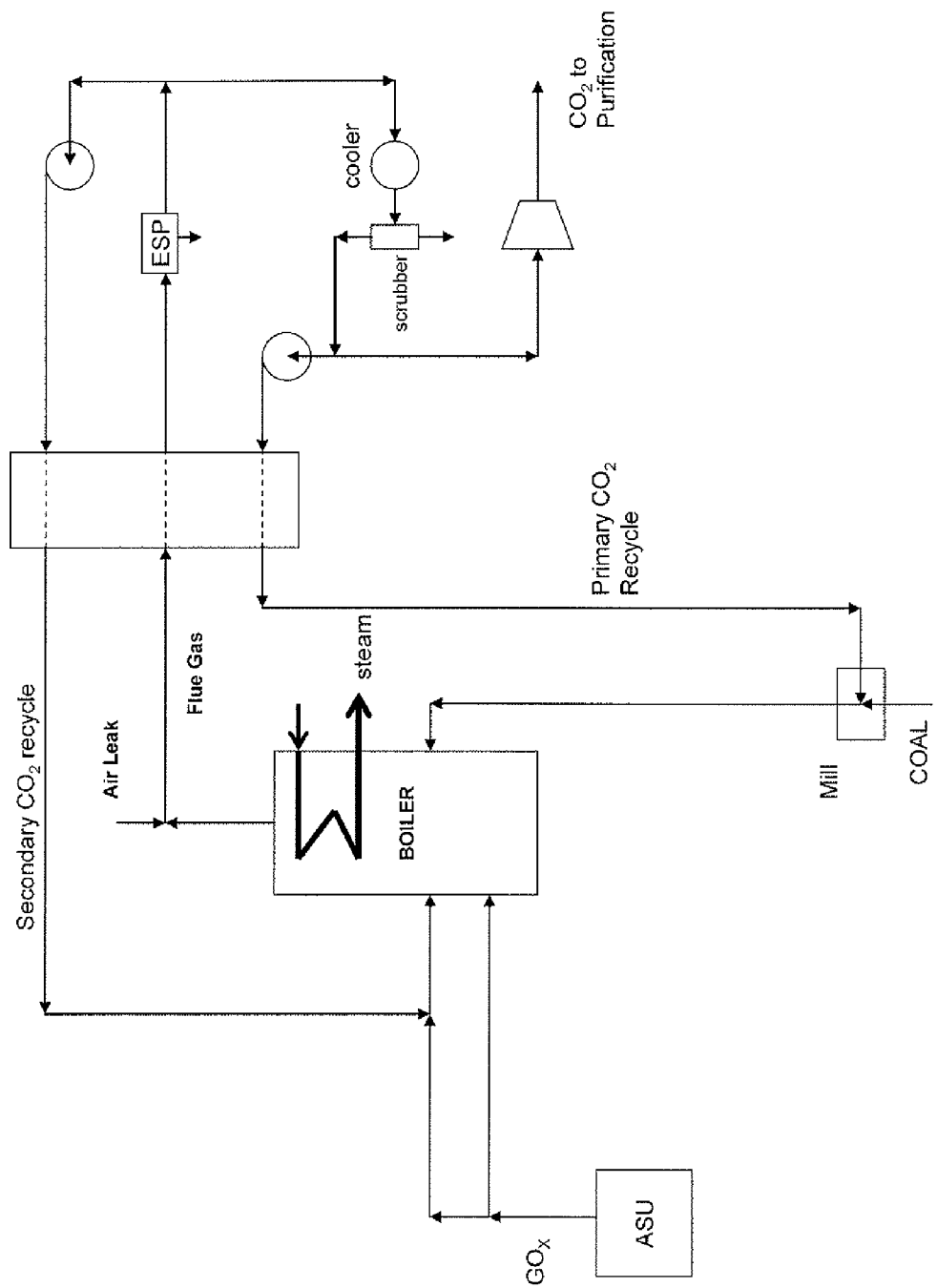
FIG. 1 is a stylized diagram of an illustrative embodiment of an oxy-combustion process for a coal power plant.
Figure 2:
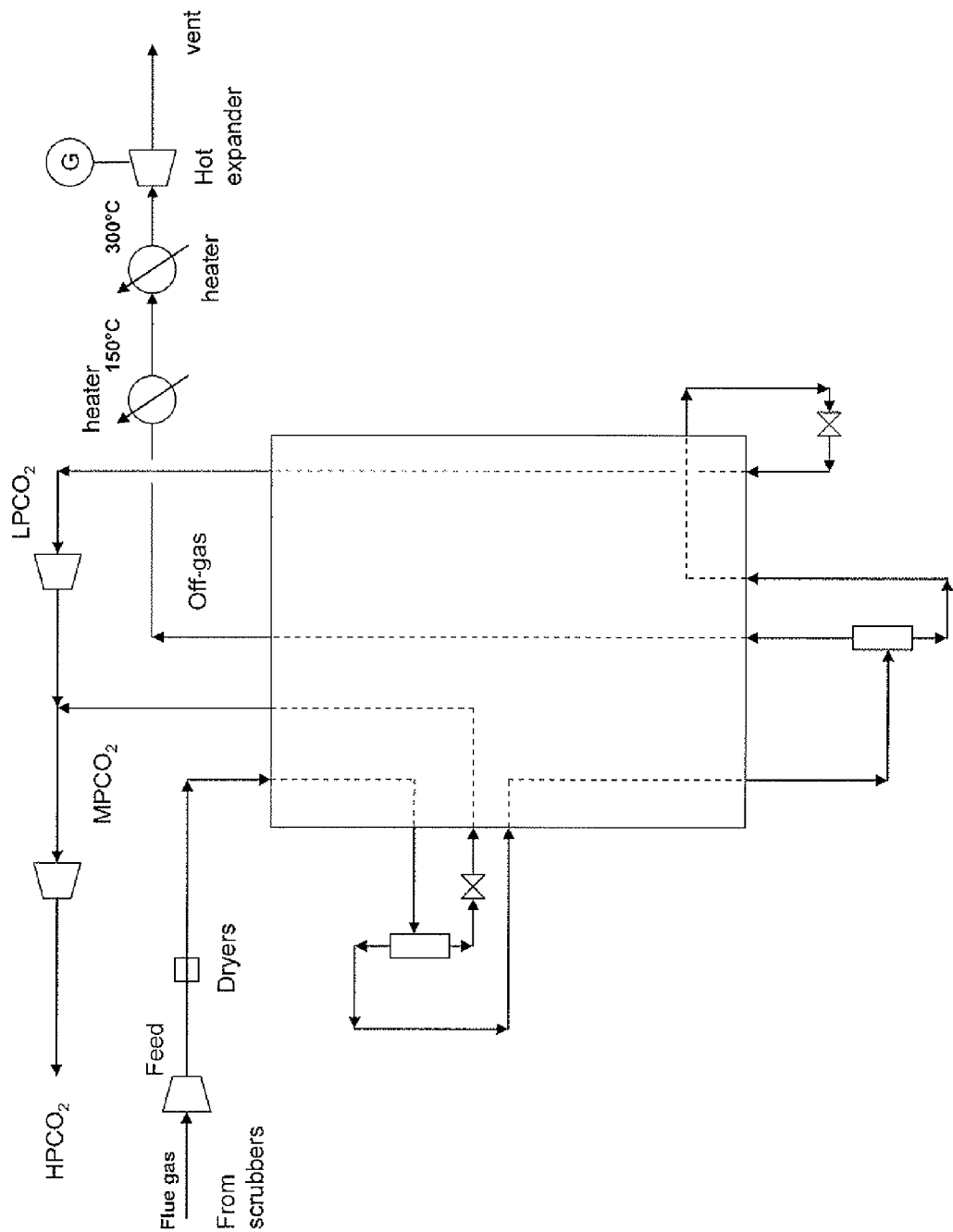
FIG. 2 is a stylized diagram of an illustrative embodiment of a typical partial condensation process with a hot gas expander.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will, of course, be appreciated that in the development of any such actual embodiment, numerous implementation-specific decisions must be made to achieve the developer's specific goals, such as, compliance with system-related and business-related constraints, which will vary from one implementation to another. Moreover, it will be appreciated that such a development effort might be complex and time-consuming, but would, nevertheless, be a routine undertaking for those of ordinary skill in the art having the benefit of this disclosure.

Figure 3:
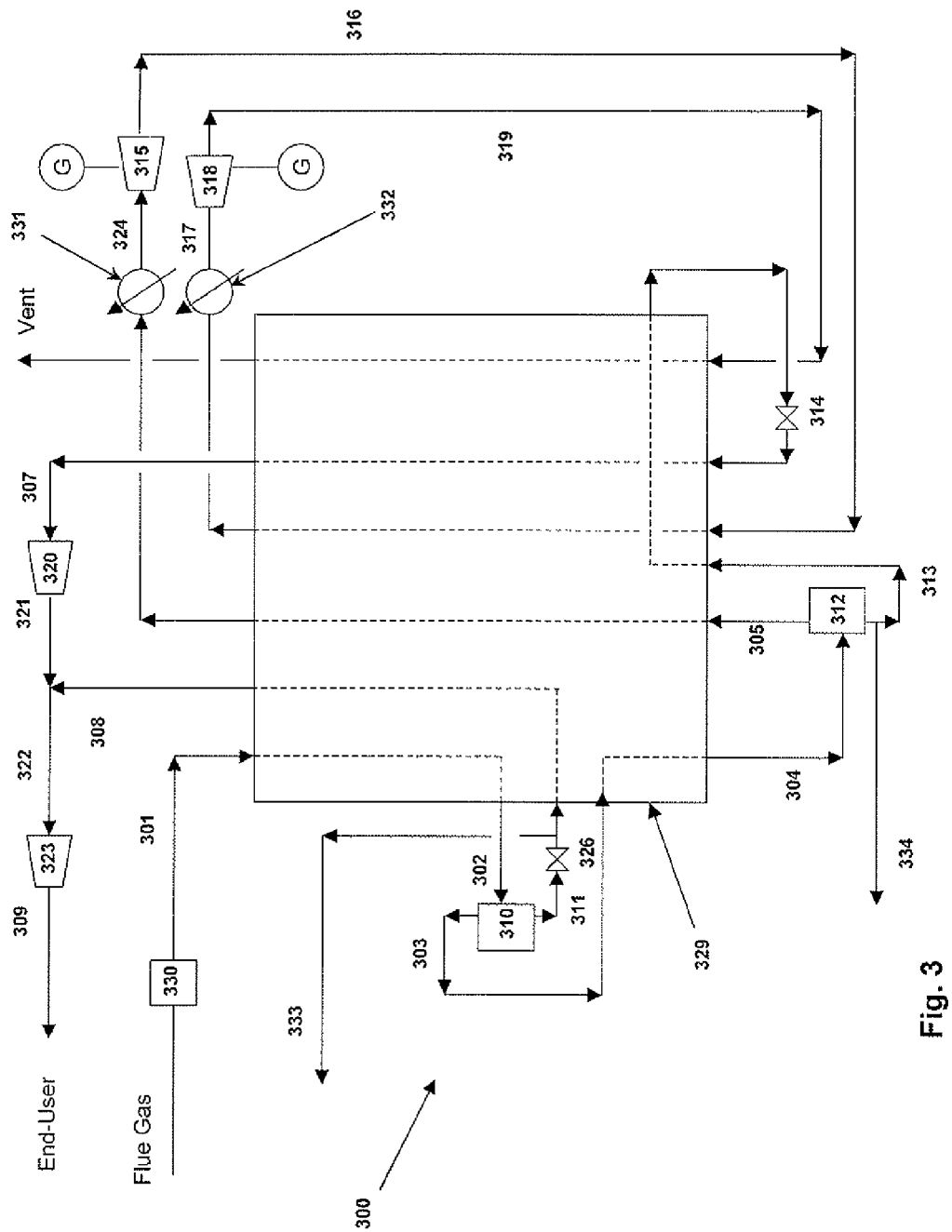
FIG. 3 is a stylized diagram of an illustrative embodiment of the present invention having two separators to remove carbon dioxide from the flue gas, and two expanders to remove energy from the off-gas stream.

FIG. 3 depicts an illustrative embodiment of process 300 according to the present invention. Process 300 includes a first separator 310, a second separator 312, a first pressure increasing device 320, a second pressure increasing device 323, a first expander 315, a second expander 318, a first heat transfer device 331, a second heat transfer device 332, a first pressure reducing device 326, a second pressure reducing device 314, and a collective heat transfer device, which is indicated generally as 329 in FIG. 3.

Flue gas from the oxycombustion power plant is available at essentially atmospheric pressure and relatively warm temperature. After cooling to about ambient temperature, the flue gas is then compressed, the compression heat is removed in the compressor's cooler, the compressed flue gas stream is then dried in dryer 330. Examples of such drying methods may include, but are not limited to, desiccant dehumidification system, adsorption system by activated alumina or molecular sieves, permeation dryers or solvent scrubber/dryers. The flue gas also contains some other impurities, mainly the by-products of the coal combustion, such as traces of acid, $NO_x$ (like nitrogen oxide NO and nitric oxide $NO_2$), $SO_x$ (like sulfur dioxide $SO_2$, sulfur trioxide $SO_3$) etc. In some circumstances, it is preferable to remove some of these impurities in a scrubber system prior to cryogenic treatment. For example, $NO_2$ can react with water and $SO_2$ in the scrubber to yield sulfuric acid or, in the absence of $SO_2$ or if $SO_2$ is depleted, can react with water to yield nitric acid. With sufficient residence time, NO can react with oxygen to form $NO_2$, which, is then converted to the acids, as described. The acids in the water can be neutralized with a hydroxide solution or some other chemical means. The choice of front-end removal of those impurities depends upon the final use of $CO_2$ and the economics of wet treatment of flue gas. Indeed, the $NO_2$ and $SO_2$ being heavier than $CO_2$ would concentrate in the $CO_2$ product. The presence of $SO_2$, $NO_2$, and sometimes $O_2$ and NO, in the $CO_2$ can be objectionable for sequestration or EOR applications. In this situation, these impurities can be removed in the front-end treatment so that $CO_2$ will not contain significant level of those impurities.

Once the compressed flue gas stream is cooled and dried, and its impurities optionally removed, to form compressed dry flue gas stream 301, it is further cooled 302 and sent to a first separator 310. The compressed dry flue gas stream 301 may be at a pressure of about 30 bar, its temperature can be between about 5° C. and about 35° C. It is possible to perform the drying of the flue gas at a lower pressure followed by further compressing the dry flue gas to the required pressure for cryogenic treatment. The further cooled flue gas stream 302 will be at least partially condensed. Within the first separator 310, this further cooled flue gas stream 302 is separated into a first vapor stream 303 and a first liquid stream 311. This first liquid stream 311 may be comprised of at least 90% carbon dioxide. The first vapor stream 303 is further cooled and at least partially condensed 304, and sent to a second separator 312. The at least partially condensed stream 304 may have a temperature of about −52° C. Within the second separator 312, this further cooled first vapor stream 304 is separated into a second vapor stream 305 and a second liquid stream 313. This second liquid stream 313 may be comprised of at least 90% carbon dioxide.

The second liquid stream 313 is warmed and vaporized 307. This warmed and vaporized stream 307 may have a pressure of about 9 bar and a temperature as low as of about −40° C. The colder temperature lowers the compression power of the carbon dioxide compressor. The temperature is preferably warmer than the dew point of the gas, so sending liquid droplets into the compressor inlet can be avoided. The −40° C. minimum temperature allows the use of lower cost carbon steel and not higher cost stainless steel for piping and compression equipment. The second liquid stream 313 may pass through a second pressure-reducing device 314. After passing through the second pressure-reducing device 314, the second liquid steam 313 may have a pressure of about 9 bar. The vaporized second liquid stream 307 is compressed in a first pressure-increasing device 320, thereby, creating a higher-pressure stream 321. A portion of the second liquid stream 313 may remain a liquid 334. The first liquid stream 311 may pass through a first pressure-reducing device 326. After passing through the first pressure reducing device 326 the first liquid stream may have a pressure of about 19 bar and may have a temperature of about −6° C. The at least a portion of the first liquid stream 311 is warmed and vaporized 308, at which point it combines with stream 321 to produce a combined stream 322. A portion of the first liquid stream 311 may remain a liquid 333. Combined stream 322 is further compressed in a second pressure-increasing device 323, thereby, creating a high-pressure stream 309.

The second vapor stream 305 is warmed in exchanger 329 and further warmed in first heat transfer device 331 to a temperature higher than that of the flue gas 301, thereby, resulting in a warm third vapor stream 324. This warm third vapor stream 324 may have a temperature that is between about 35° C. and about 80° C. This warm third vapor stream 324 is then expanded in a first expander 315, thereby, resulting in a cool fourth vapor stream 316. This cool fourth vapor stream 316 may have a pressure of about 6.6 bar. This cool fourth vapor stream 316 is then warmed in exchanger 329 and further warmed in exchanger 332 to a temperature higher than that of the flue gas 301, thereby, resulting in a warm fifth vapor stream 317. This warm fifth vapor stream 317 may have a temperature that is between about 35° C. and about 80° C. This warm fifth vapor stream 317 is then expanded to about atmospheric pressure in a second expander 318, thereby, resulting in a cool sixth vapor stream 319. This cool sixth vapor stream 319 is then warmed and vented.

Power generated by first expander 315 or second expander 318 can be used to drive electric generators to produce electricity, or can be used to partially drive the boost compressor (not shown) for the feed gas 301, or carbon dioxide product (first or second pressure increasing devices 320 or 323).

The external heat exchanger used to heat the off-gas (first and second heat transfer devices 331 and 332) may be a heat recovery exchanger, wherein the hot compressed feed gas or hot compressed carbon dioxide exchanges heat with the off-gas to provide the necessary heat. These heat exchangers can be an intercooler, or aftercooler of the flue gas compressor, or carbon dioxide product compressors (first or second pressure increasing devices 320 or 323). In most isothermal compressors, the gas exiting a compressor stage is usually about 90° C. to about 120° C., and it can be used as heating medium, therefore, heating to the level of about 50° C. can suit very well for the isothermal compressor, which is favorable for any power saving scheme.

Thanks to the refrigeration supplied by the first and second expanders 315 and 318, the carbon dioxide fractions 311 and 313 can be produced at low temperature, ranging from about −40° C. to about 3° C. Furthermore, this additional refrigeration also allows extracting the $CO_2$ streams 307 and 308 at higher pressures to save more compression power.

Since the triple point of carbon dioxide is −56.6° C., it is preferable to limit the outlet temperature of the first and second expanders 315 and 318 to about −54° C. to avoid the risk of carbon dioxide freezing at the cold end of the exchanger. This constraint can be met by using the first and second expanders 315 and 318, with inlet temperature about 35° C. to about 70° C. and to expand from about 30 bar to about atmospheric pressure as proposed in the present application. A single expander would yield an outlet temperature that was too cold, and would require a higher expander inlet temperature, which is more difficult to achieve, as in the case of the hot gas expander. Without heating to about 35° C. to about 70° C., it is also feasible to obtain similar performance of the 2 expanders by using 3 expanders in series with inlet temperatures of about 10° C. to about 20° C. However, not only is there an additional cost for the third expander, also the heat exchanger would cost higher due to an additional passage for the third expander flow.

Figure 4:
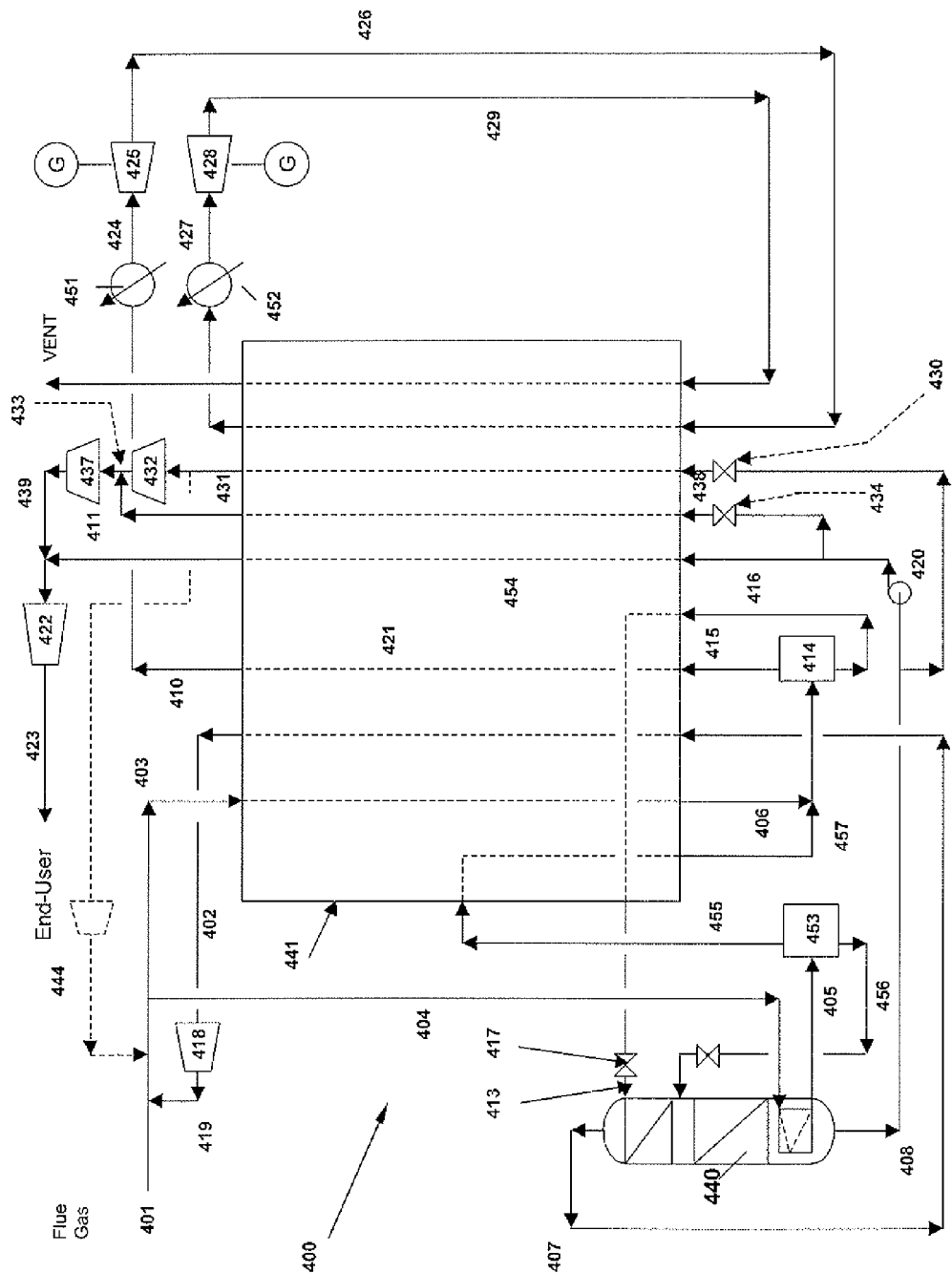
FIG. 4 is a stylized diagram of an illustrative embodiment of the present invention having a stripping column and a separator, and two expanders to remove energy from the off-gas stream.

In some situations, it is desirable to produce a $CO_2$ product essentially free of oxygen like in applications for Enhanced Oil Recovery (EOR). FIG. 4 depicts an illustrative embodiment of process 400 for oxygen removal according to the present invention. Process 400 includes a first separator 414, a second separator 453, a stripping column 440, a first pressure increasing device 420, a second pressure increasing device 422, a third pressure increasing device 432, a fourth pressure increasing device 437, a fifth pressure increasing device 418, first expander 425, a second expander 428, a first heat transfer device 451, a second heat transfer device 452, a first pressure reducing device 417, a second pressure reducing device 430, and a collective heat transfer device, which is indicated generally as 441 in FIG. 3.

Once the compressed flue gas stream 401 is cooled and dried, a portion 404 is sent to a stripping column 440 reboiler wherein it serves as the reboiler inlet stream 404. The stripping column 440 may operate at about 10 bar. The stripping column 440 may operate at between about 10 bar and about 25 bar. This flue gas stream 404 reboils the stripping column 440 by condensing at least a portion of the flue gas stream 404 in the reboiler. This reboiler inlet stream 404 then exits the stripping column's reboiler as the reboiler outlet stream 405. Stream 405 is sent to a second separator 453, where it is separated into the reboiler outlet vapor stream 455 and reboiler outlet liquid stream 456. Reboiler outlet liquid stream 456 feeds the stripping column. Reboiler outlet vapor stream 455 is then further cooled, and will be at least partially condensed, thereby, resulting in separator inlet stream 457. The remaining portion 403 of the flue gas is cooled, partially condensed to yield stream 406. Within the first separator 414, streams 406 and 457 are separated into a first vapor stream 415 and a first liquid stream 416. This first liquid stream 416 is then sent to a first pressure-reducing device 417, thereby, resulting in a stripping feed stream 413. This stripping feed stream 413 is then sent to the stripping 440.

The stripping overhead stream 407 is warmed 402, and then sent to a fifth pressure-increasing device 418, thereby, creating a recycle steam 419. Of course, the warmed stripping overhead stream can feed to a stage of the flue gas compressor thus simplifying the machine arrangement at the expense of a slightly larger drying unit. The warmed and vaporized stripping column overhead stream 402 may have a temperature that is between about 35° C. and about 40° C. This recycle stream 419 is then combined with flue gas stream 401.

A portion of the stripping column bottom stream 408 is sent to a first pressure increasing device 420, which results in a first medium pressure liquid stream 421. The stripping column bottom stream 408 contains less than 10 ppmv of oxygen. This first medium pressure liquid stream 421 is then warmed and vaporized, then sent to a second pressure increasing device 422, thereby, resulting in a high pressure stream 423. This high-pressure stream 423 is then sent to the end-user.

The first vapor stream 415 is warmed in exchanger 441 to about ambient temperature and further warmed in exchanger 451 to a temperature higher than that of the flue gas 401, thereby, resulting in a first warm vapor stream 424. This first warm vapor stream 424 may have a temperature that is between about 35° C. and about 80° C. This first warm vapor stream 424 is then expanded in a first expander 425, thereby, resulting in a cool second vapor stream 426. This cool second vapor stream 426 is then warmed in exchanger 441 to about ambient temperature and further warmed in exchanger 452 to a temperature higher than that of the flue gas 401, thereby, resulting in a second warm vapor stream 427. This second warm vapor stream 427 may have a temperature that is between about 35° C. and about 80° C. This second warm vapor stream 427 is then expanded in a second expander 428, thereby, resulting in a cool third vapor stream 429. This cool third vapor stream 429 is then warmed and vented.

Figure 4A:
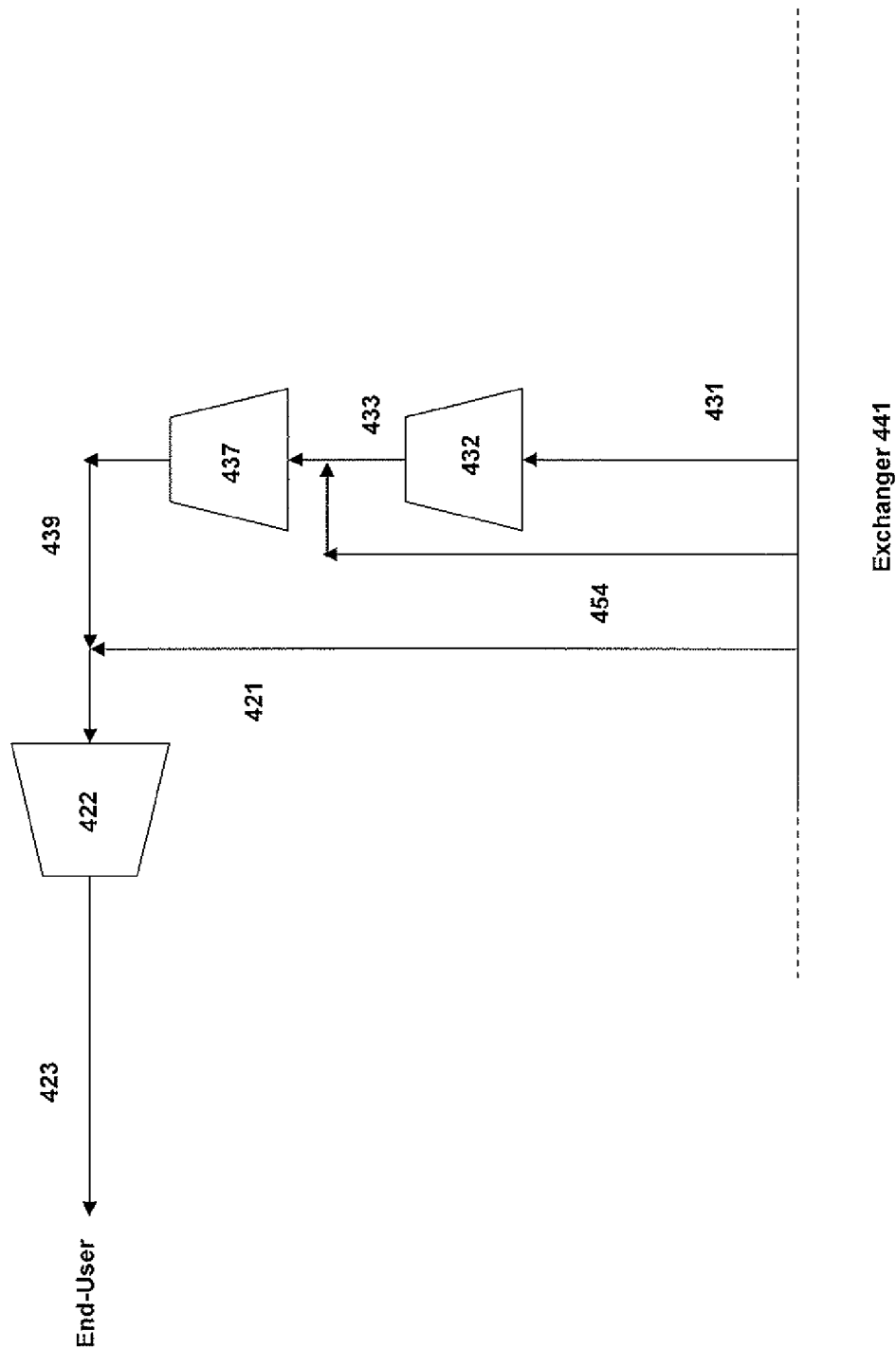

In another embodiment, as illustrated in both FIG. 4 and FIG. 4a, a portion of the stripping column bottom stream 408 is removed prior to the first pressure-increasing device 420. This removed portion is sent to a second pressure reducing device 430, and warmed and vaporized, thereby, creating a low-pressure stream 431. This low-pressure stream 431 is then compressed in a third pressure increasing device 432, thereby, creating a second medium pressure stream 433.

In another embodiment, as illustrated in both FIG. 4 and FIG. 4a, a portion of the stripping column bottom stream 408 is removed after the first pressure-increasing device 420. This removed portion is sent to a third pressure reducing device 434, and warmed and vaporized, thereby, creating an intermediate-pressure stream 454. This intermediate-pressure stream 454 is then compressed in a fourth pressure increasing device 437, thereby, creating a second medium-pressure stream 439. This second-medium pressure stream 439 is then combined with the first medium-pressure stream 421, prior to admission into the second pressure increasing device 422.

Power generated by first expander 425 or second expander 428 can be used to drive electric generators to produce electricity, or can be used to partially drive the boost compressor for the feed gas 401, or carbon dioxide product 432, 437, or 422.

The external heat exchanger used to heat the off-gas 451 and 452 may be a heat recovery exchanger wherein the hot compressed feed gas or hot compressed carbon dioxide exchanges heat with the off-gas to provide the necessary heat. These heat exchangers can be an intercooler or aftercooler of the flue gas 401 or carbon dioxide product compressors 431, 437, or 422. In most isothermal compressors, the gas exiting a compressor stage is usually about 90° C. to about 120° C., and it can be used as heating medium, therefore, heating to the level of about 50° C. can suit very well for the isothermal compressor, which is favorable for any power saving scheme.

Thanks to the refrigeration supplied by the 2 expanders 425 and 428, the carbon dioxide fractions can be extracted at low temperature, ranging from about −40° C. to about 3° C. This additional refrigeration also allows extracting the $CO_2$ product streams at higher pressures to save more compression power.

Since the triple point of carbon dioxide is −56.6° C., it is preferable to limit the outlet temperature of the expanders 425 and 428 to about −54° C. to avoid the risk of carbon dioxide freezing at the cold end of the exchanger. This constraint can be met by using 2 expanders 425 and 428 with inlet temperature about 35° C. to about 70° C. and to expand from about 30 bar to about atmospheric pressure as proposed in the present application. A single expander would yield an outlet temperature that was too cold, and would require a higher expander inlet temperature which is more difficult to achieve as in the case of the hot gas expander. Without heating to about 35° C. to about 70° C., it is also feasible to obtain similar performance of the 2 expanders by using 3 expanders in series with inlet temperatures of about 10° C. to about 20° C. However, not only is there an additional cost for the third expander, also, the heat exchanger would cost higher due to an additional passage for the third expander flow.

Figure 5:
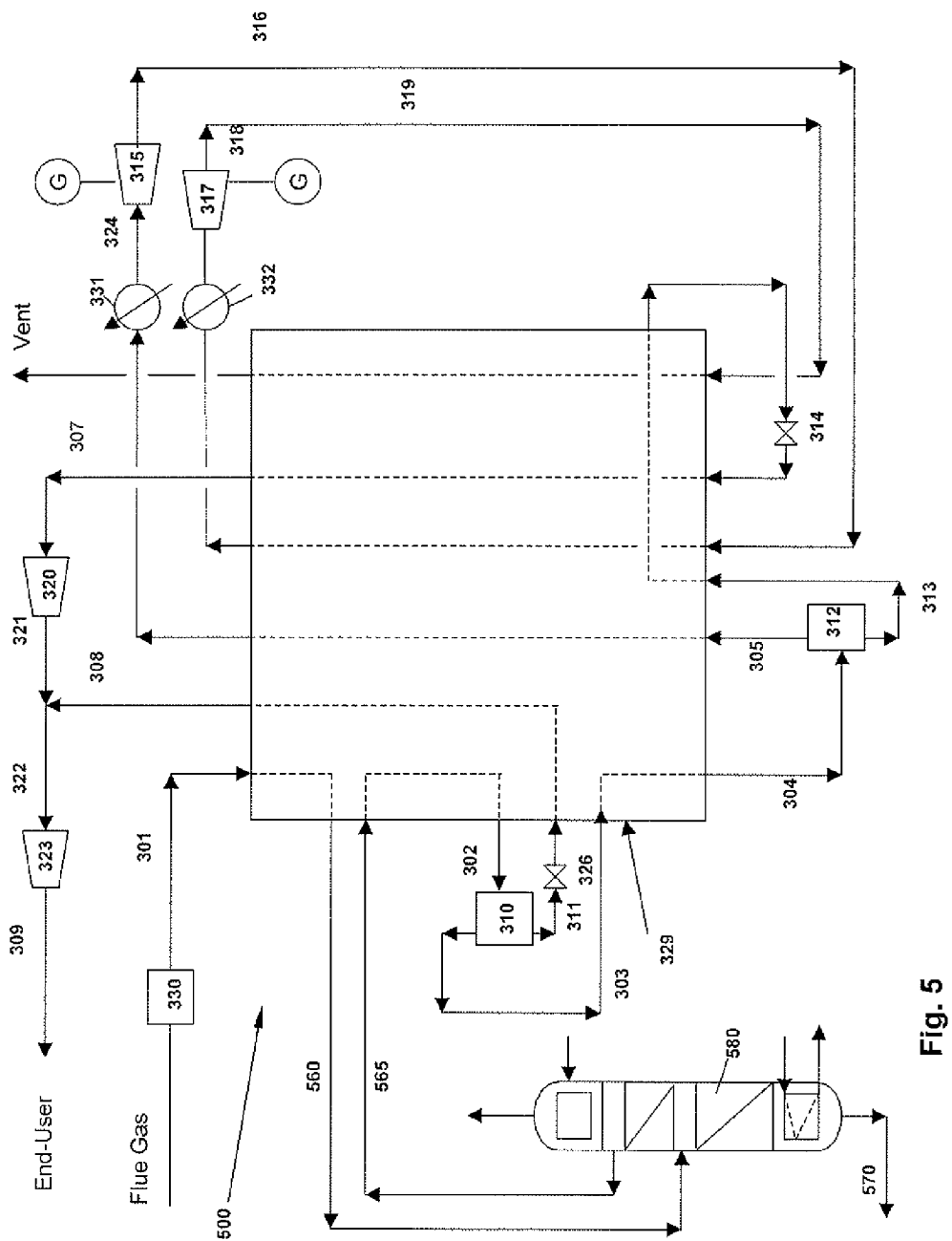
FIG. 5 is a stylized diagram of an illustrative embodiment of the present invention having distillation column and two separators, and two expanders to remove energy from the off-gas stream.

In another embodiment, as illustrated in FIG. 5, the compressed dry flue gas 560 is sent to a distillation column 580 to remove the $SO_2$ and $NO_2$ impurities. A bottom stream 570 containing the captured $SO_2$ and $NO_2$ impurities is recovered and sent to the $SO_2$ and $NO_2$ treatment units. A vapor stream 565 exiting the top of the distillation column is essentially free of $SO_2$ and $NO_2$ and is further cooled and partially condensed. The vapor and liquid fractions of the partial condensation steps then follow the similar paths as in FIG. 3. This type of process arrangement can be used when the $CO_2$ product can contain some oxygen, but only traces of $SO_2$ or $NO_2$.

Figure 6:
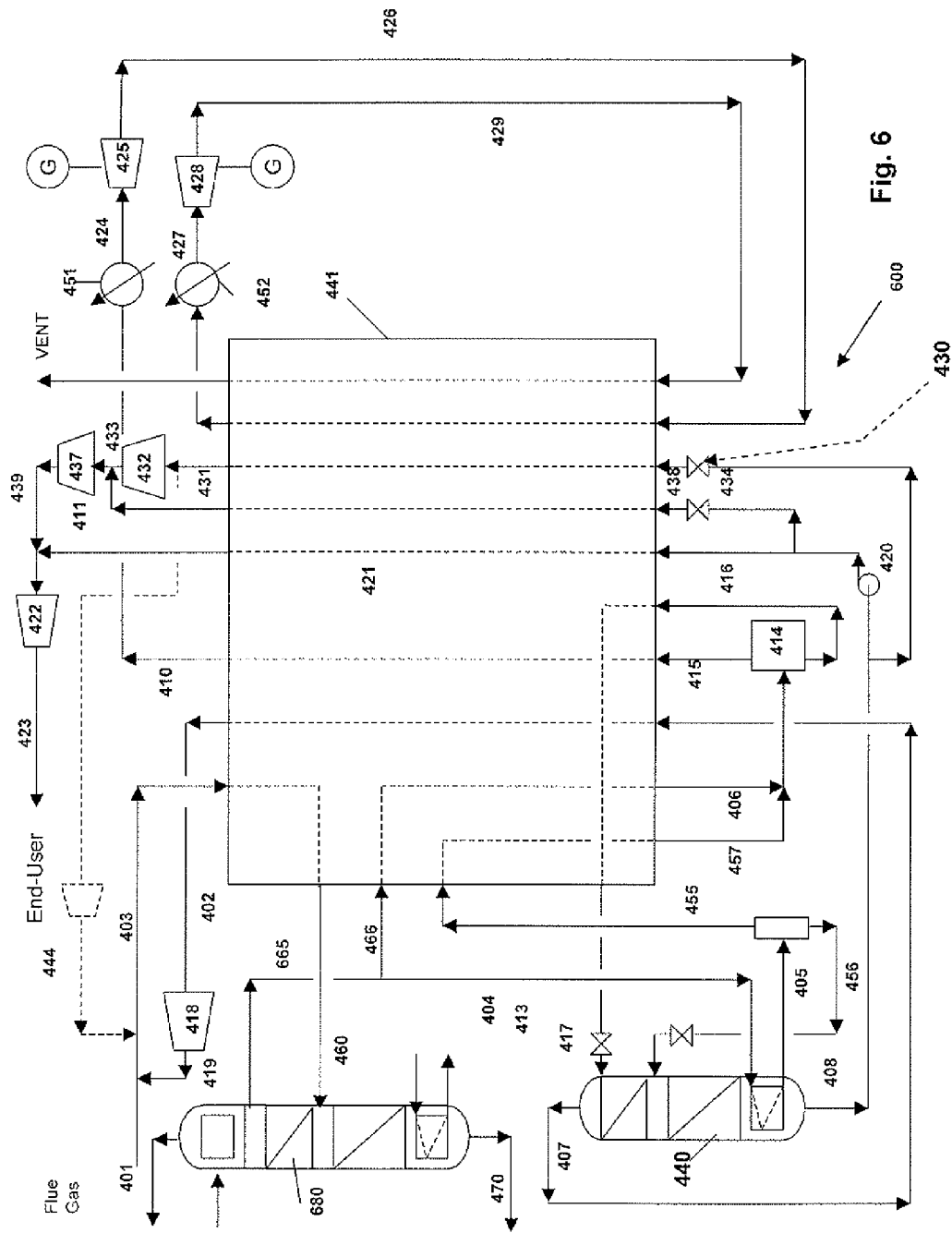
FIG. 6 is a stylized diagram of an illustrative embodiment of the present invention having two distillation columns and two separators, and two expanders to remove energy from the off-gas stream.

The embodiment of FIG. 6 is similar to FIG. 5, a distillation column 680 for $SO_2$ and $NO_2$ removal is provided near the warm end of the heat exchanger 641. The top vapor 665, essentially free of $SO_2$ and $NO_2$, is cooled and partially condensed in the similar paths as in FIG. 4. This type of process arrangement can be used when the $CO_2$ product contains only traces of oxygen, $SO_2$, and $NO_2$.

Figure 7:
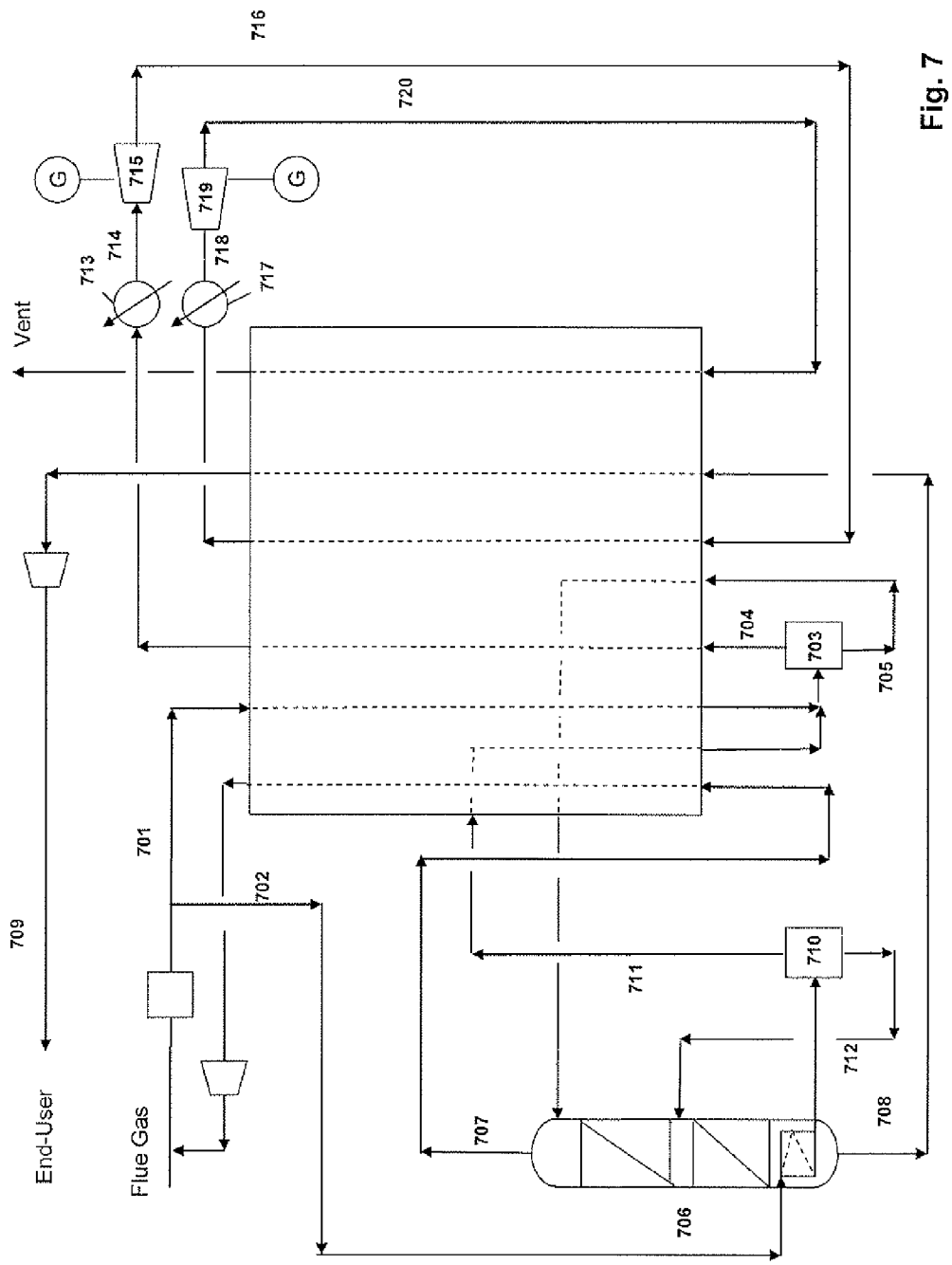
FIG. 7 is a stylized diagram of another illustrative embodiment of the present invention having striping column and two separators, and two expanders to remove energy from the off-gas stream.

In another embodiment, as illustrated in FIG. 7, a first portion of the compressed dry flue gas 701 is sent to a first phase separation device 703, wherein it is separated into a first vapor stream 704 and a first liquid stream 705. A second portion of the compressed dry flue gas 702 is cooled in the condenser of a stripping column 706, then sent to a second phase separation device 710, wherein it is separated into a second vapor stream 711 and a second liquid stream 712. Second liquid stream 712 is sent to stripping column 706, wherein it is separated into a third vapor stream 707 and a third liquid stream 708. Third vapor stream 707 is then cooled and recirculated back to the incoming flue gas line. Third liquid stream 708, is warmed and vaporized, then compressed and sent to an end user 709. First liquid stream 705 is heated and sent to stripping column 706. First vapor stream 704 is warmed in exchanger 713 to a temperature higher than that of the flue gas, thereby, resulting in a warm fourth vapor stream 714. This warm fourth vapor stream 714 may have a temperature that is between about 35° C. and about 80° C. This warm fourth vapor stream 714 is then expanded in a first expander 715, thereby, resulting in a cool fifth vapor stream 716. This cool fifth vapor stream 716 may have a pressure of about 6.6 bar. This cool fifth vapor stream 716 is then warmed in exchanger 717 to a temperature higher than that of the flue gas, thereby, resulting in a warm sixth vapor stream 718. This warm sixth vapor stream 718 may have a temperature that is between about 35° C. and about 80° C. This warm sixth vapor stream 718 is then expanded to about atmospheric pressure in a second expander 719, thereby, resulting in a cool seventh vapor stream 720. This cool seventh vapor stream 720 is then warmed and vented.

What is claimed is:

1. An improved carbon dioxide separation process for oxy-combustion coal power plants comprising;
    a) warming at least a portion of waste stream separated from a flue gas stream, and
    b) expanding said waste stream, thereby resulting in a cool vapor exhaust stream,
wherein said cool vapor exhaust stream cools said flue gas stream through indirect heat exchange,
wherein said waste stream separation from said flue gas stream comprises;
    i) cooling a compressed dry flue gas, partially condensing and phase separating said cooled dry flue gas into a first vapor stream and a first liquid stream,
    ii) further cooling said first vapor stream, partially condensing and phase separating said further cooled first vapor stream into a second vapor stream and a second liquid stream,
wherein said waste stream comprises said second vapor stream, and
wherein said cool vapor exhaust stream is vented.

2. The process of claim 1, further comprising repeating steps a) and b) at least once.

3. The process of claim 1, further comprising;
    c) warming and venting said cool vapor exhaust stream.

4. The process of claim 1, wherein steps i) and ii) comprise;
    iii) warming and vaporizing said first liquid stream, and said second liquid stream;
    iv) warming said second vapor stream, thereby, resulting in a warm third vapor stream;
    v) expanding said third vapor stream, thereby, resulting in a cool fourth vapor stream;
    vi) warming said fourth vapor stream, thereby, resulting in a warm fifth vapor stream;
    vii) expanding said fifth vapor stream, thereby, resulting in a cool sixth vapor stream; and
    viii) warming and venting said sixth vapor stream.

5. The process of claim 4, wherein said third vapor stream has a temperature of between about 35° C. to about 80° C.

6. The process of claim 4, wherein said fifth vapor stream has a temperature of between about 35° C. to about 80° C.

7. The process of claim 4, wherein said first liquid stream comprises at least 90% carbon dioxide.

8. The process of claim 4, wherein said second liquid stream comprises at least 90% carbon dioxide.

9. The process of claim 4, wherein said vaporized and warmed first and second liquid streams of step (iii) are extracted at a temperature of between about 35° C. and −40° C.

10. The process of claim 4, wherein said vaporized and warmed first and second liquid streams of step (iii) are further compressed.

11. The process of claim 1, wherein the $SO_2$ and $NO_2$ impurities of the compressed dry flue gas are removed in a distillation column prior to said partially condensing and phase separating of step (i).

12. The process of claim 1, wherein steps i) and ii) comprise;
    iii) warming and vaporizing at least a portion of said first liquid stream, and at least a portion of said second liquid stream, thereby, creating a high pressure vapor stream;
    iv) warming said second vapor stream, thereby, resulting in a warm third vapor stream;
    v) expanding said third vapor stream, thereby, resulting in a cool fourth vapor stream;
    vi) warming said fourth vapor stream, thereby, resulting in a warm fifth vapor stream;
    vii) expanding said fifth vapor stream thereby, resulting in a cool sixth vapor stream; and
    viii) warming and venting said sixth vapor stream.

13. The process of claim 12, wherein said third vapor stream has a temperature of between about 35° C. to about 80° C.

14. The process of claim 12, wherein said fifth vapor stream has a temperature of between about 35° C. to about 80° C.

15. The process of claim 1, wherein said first liquid stream comprises at least 90% carbon dioxide.

16. The process of claim 1, wherein said second liquid stream comprises at least 90% carbon dioxide.

17. The process of claim 12, wherein said warmed and vaporized first and second liquid streams of step (iii) are extracted at a temperature of between about 35° C. and about −40° C.

18. The process of claim 12, wherein said warmed and vaporized first and second liquid streams of step (iii) are further compressed.

19. The process of claim 12, wherein at least a portion of said first liquid stream remains a liquid.

20. The process of claim 12, wherein at least a portion of said second liquid stream remains a liquid.

* * * * *